Figure 1:
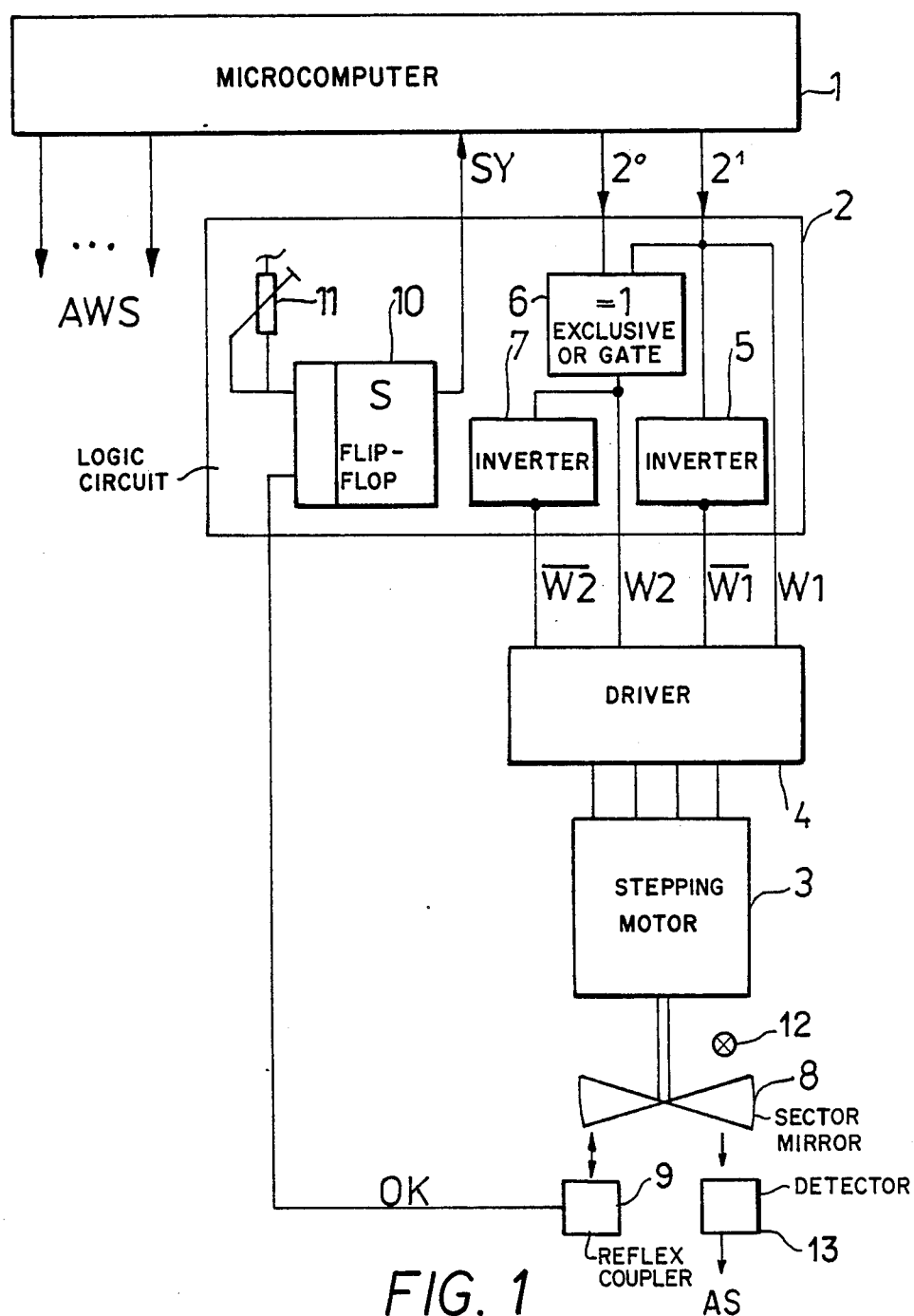

United States Patent [19]

Heinrich et al.

[11] Patent Number: 4,833,385
[45] Date of Patent: May 23, 1989

[54] METHOD FOR THE PHASE SYNCHRONIZATION OF STEP-DRIVE CONTROLLED EQUIPMENT

[75] Inventors: Winfried Heinrich; Nikolaus Schmidt, both of Jena, German Democratic Rep.

[73] Assignee: Jenoptik Jena G.m.b.H., Jena, German Democratic Rep.

[21] Appl. No.: 119,365

[22] Filed: Nov. 10, 1987

[30] Foreign Application Priority Data

Dec. 31, 1986 [DD] German Democratic Rep. ................................ 2989218

[51] Int. Cl.⁴ ............................................. H02P 8/00
[52] U.S. Cl. .................................. 318/696; 318/685; 356/323; 356/325
[58] Field of Search ................. 318/696, 685; 356/323, 356/325

[56] References Cited

U.S. PATENT DOCUMENTS

| | | | |
|---|---|---|---|
| 4,281,897 | 8/1981 | Fletcher | 350/274 |
| 4,305,663 | 12/1981 | Perkins et al. | 356/323 |
| 4,386,852 | 6/1983 | Cassidy et al. | 356/323 |

FOREIGN PATENT DOCUMENTS

242089A1 1/1987 German Democratic Rep. .

Primary Examiner—William M. Shoop, Jr.
Assistant Examiner—Saul M. Bergmann
Attorney, Agent, or Firm—Jordan and Hamburg

[57] ABSTRACT

A method for the phase synchronization of step-drive-controlled equipment, in particular of optical modulation devices for multiple-beam spectrophotometers.

Starting with the phase comparison of a synchronization signal formed from a sensor signal produced by a fixed phase difference from information signals of the device, the phase relationship of the commutator signals of the stepping motor is controlled with a predetermined reference signal.

3 Claims, 3 Drawing Sheets

METHOD FOR THE PHASE SYNCHRONIZATION OF STEP-DRIVE CONTROLLED EQUIPMENT

BACKGROUND OF THE INVENTION

The invention may generally be applied to the phase synchronization of step-drive controlled equipment to signals or to other equipment.

The invention is especially adapted for use in optical modulation devices for multiple-beam spectrophotometers driven by stepping motors.

Devices running continuously, in which signals are generated that are synchronous to operation, are known in many cases. For instance, evaluation of modulation devices, in particular for multiple-beam spectrophotometers, are required regardless of whether the devices are driven, as hitherto generally customary, by synchronous motors (for example, DD-PS No. 65,468) or stepping motors (for example, DE-OS 3,202,807, DD-PS No. 228,058). In DE-OS No. 3,202,807 a high-frequency clock signal is used to generate the control frequency of the step drive therefrom with a divider and, in addition, to form a demodulation signal via an additional divider, synchronized by the optical signal by means of zero crossing detectors.

This solution, which is applicable only to single-beam instruments, additionally has the considerable disadvantage that, at high absorptions of the optical sample, noise causes the demodulation to deteriorate.

In DD-PS No. 228,058 pulses of step-drive control frequency are supplied to a step drive, but are alternatively guided through an adjustable retarding step with subsequent pulse narrowing and activate a counter logic circuit so that the evaluation signals thereby formed, which serve for analog data processing, have the proper phase with respect to the electrical analog signals formed from the optical signals.

For this purpose an optocoupler cooperating with the modulation mirror delivers a synchronization signal which resets the counter logic circuit at the beginning of each modulation period. Although the disadvantages of DE-OS No. 3,202,807 are thereby avoided, since the resettable retarding step permits adjustment to be made only within a step, it is necessary to preadjust the modulation mirror and optocoupler with stepping motors excited in definite fashion or to incorporate them in a device with sufficient accuracy.

In addition to the expense in manufacture of the instrument, the necessary preliminary adjustment complicates service on the modulation device, including the optocoupler.

Further, in the event, for example, of aging phenomena with varying load moment on the stepping motor, phase shifts between optical signals and evaluation signals appear and, with them, errors of measurement, which require a manual readjustment.

It has already been proposed (WP G No. 01 J/282,311) that for synchronization, referred to a predetermined desired phase signal, by control frequencies differing from the synchronous frequency, the stepping motor may run one step per cycle slower or faster until desired-phase and sensor signals coincide sufficiently accurately. Here the same disadvantages appear as in DD-PS No. 228,058.

In addition, it is generally known that a step drive may be activated not by pulses of a control frequency, but that commutator signals, with which the windings of the stepping motor are connected, may be generated by, for example, a computer.

SUMMARY OF THE INVENTION

The aim of the invention is to reduce manufacturing and adjustment costs of the step-drive controlled device, as well as to increase the accuracy, reproducibility and reliability of signal processing.

The object of the invention is to provide a low-cost, technologically serviceable and long-term consistent phase synchronization method wherein in-phase evaluation signals are formed without optical and mechanical adjusting processes and moment-induced load-angle variations in the stepping motor may be compensated in their effect on the phase relationship of the equipment without requiring fresh adjusting compensation.

Pursuant to the invention, this object, in a method for the phase synchronisation of step-drive-controlled equipment, in particular of optical modulation devices for multiple-beam spectro-photometers, wherein a stepping drive, activated by commutator signals, drives a device whose phase is synchronized with respect to signals or other devices, in that from the phase of a sensor signal generated by the device there is generated a synchronization signal for the synchronization of one or a plurality of information signals of the device to its evaluation signals, in particular of electrical analog signals derived from optical signals of a modulation device, is accomplished in that the phase of the synchronization signal is constantly compared with a predetermined phase reference signal and thereupon to the evaluation signals, in that as a function of the phase of the synchronization signal with respect to the phase reference signal, upon a deviation exceeding permissible limits the phase of the commutator signals for the stepping drive is varied in fine steps, and in that the phase of the synchronisation signal is set once to be synchronous to the phase of the information signals by an adjusting compensation of the synchronization signal.

It is advantageous if, for exact adjusting compensation, the phase of the synchronization signal is compared directly with the phase reference signal and that, for constant phase comparison between synchronization and phase reference signals within a permissible range, a control signal symmetrical to the synchronization-effective side of the phase reference signal is formed from the phase reference signal, which control signal is compared with the synchronization signal.

It is likewise advantageous if the phase of the commutator signals for the stepping motor is varied directionally as a function of the phase comparison of synchronization and phase reference signals.

The phase of the commutator signals for the step drive is varied in fine steps as long as possible for the purpose of automatic synchronization, until synchronization and phase-reference signals coincide sufficiently in their phase relationship. The stepped nature of phase control results from the quantization of information proper to digital technique. The control function is assumed by a phase-control step, preferably achieved by computer, which outputs commutator signals for the stepping drive directly and which performs the phase comparison between synchronization and reference signals.

If there is a phase difference between synchronization signal and phase reference signal, the evaluation of electrical analog signals of the device is blocked until the device has again become phase-synchronized.

It is advantageous to compare the synchronization signal not directly with the phase reference signal, but rather with a control signal derived from the latter, which is preferably signal-symmetric to the synchronization-relevant side of the phase reference signal.

Adjustment of the device to receive in-phase analog signals is effected by a one-time purely electrical adjustment of the phase relationship of the synchronization signal directly to the phase of one or a plurality of analog signals, in particular to the phase relationship of electrical analog signals obtained from the optical signals of the device.

In this way any expenses for an optical or mechanical adjustment in manufacture of the device, including appropriate design features, are eliminated.

A second advantageous effect of the invention is likewise that variations of the load angle, i.e., moment-induced shifts in the phase relationship between commutator signals and rotor position, such as occur, for example, in long-term variations of the moment of friction, cause no phase errors between the electrical analog signals and the analysis signals used for their evaluation, since the commutator signals are automatically shifted until the synchronization signal phase-locked to the analog signal has the proper phase with respect to a phase reference signal and thereupon to the analysis signals. Any long-term phase errors are thereby automatically compensated by the variation of the phase relationship of the stepping drive commutator signals, without any manual electrical, optical or mechanical readjustment being required as renewed compensation. The device has a high accuracy, reproducibility and reliability with reference to signal processing for a long period of time.

It is advantageous, in assembly of the modulation device, to limit the permissible range in the phase difference between information signal and sensor signal so that the error due to temperature, for example, of the electrical adjustment remains sufficiently small. However, this expedient, to be observed in manufacture, bears no relation to the costs of a mechanical or optical adjustment.

BRIEF FIGURE DESCRIPTION

Figure 4:
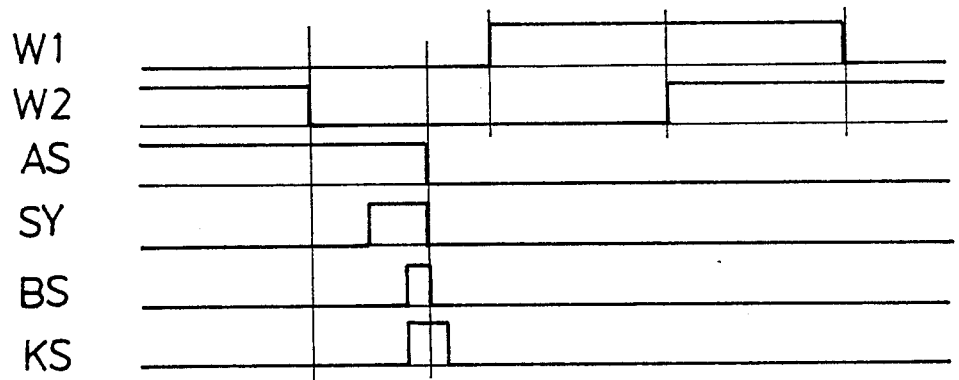
Figure 5:
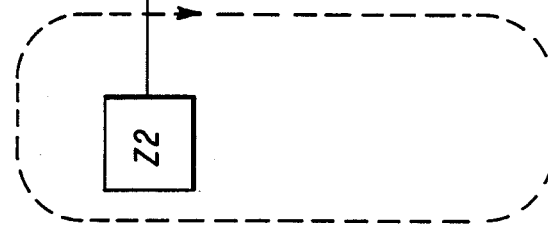
Figure 5:
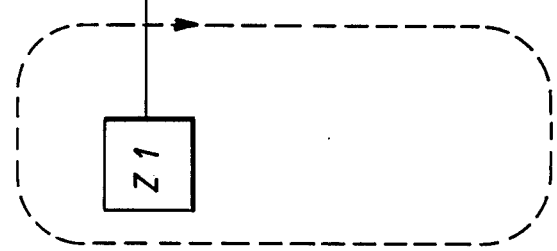

The invention will be explained in detail below by means of an example illustrated in the drawing, wherein FIG. 1 shows a circuit arrangement for the phase synchronization of a stepping drive controlled modulation device FIG. 2, signal path after completed runup of the stepping motor of a modulation device FIG. 3, signal path after automatic synchronization FIG. 4, signal path after terminated electrical adjustment FIG. 5 is a table for further explaining the invention.

DETAILED DISCLOSURE OF THE INVENTION

In the schematic representation of FIG. 1 a single-chip microcomputer 1 delivers, by way of program and time-routine simplification, 2-bit counter signals $2^1$ and $2^0$ from which a logic circuit 2 obtains commutator signals for a stepping motor 3 (four-phase, unipolar).

The more significant counter signal $2^1$ is delivered directly as a commutator signal $\overline{W1}$ to a driver 4 for the winding currents of the stepping motor 3. Inverse commutator signal $\overline{W1}$ is produced from commutation signal $\overline{W1}$ by inversion in an inverter 5. The counter signals $2^1$ and $2^0$ are in addition linked by an EX-OR gate 6, so that a commutator signal $\overline{W2}$ and, due to its inversion by means of an inverter 7, a commutator signal W 2, are produced.

The corresponding windings of the stepping motor 3 are activated by the driver 4 according to the state of the 2-bit counter.

With the software counter of the single-chip microcomputer 1 running, the stepping motor 3 operates at corresponding speed as does a sector mirror 8 of a modulation device coupled to the stepping motor 1. At the same time beam modulation of a beam from radiation source 12 to detector 13, and beam switching between the measurement and reference paths, the details of which are not shown here, takes place. The detector 13 produces the analog signal AS.

In addition, a sensor designed as reflex coupler 9, in cooperation with the sector mirror 8, forms an optocoupler signal OK. The latter, supplied to the one shot 10 forming part of the logic 2, generates at the output thereof a synchronization signal SY, which is processed in the single-chip microcomputer 1.

For the purpose of electrical phase adjustment, the pulse width of the flip-flop 10 may be set by a variable resistance 11.

When, controlled by the single-chip microcomputer 1, synchronization between a reference signal BS inside the computer and the synchronization signal SY is obtained. If necessary, still another modulation device not represented in the drawing (for example, as disclosed in GDR Pat. No. 242,089, FIG. 1) has been synchronized thereto, the microcomputer 1 furnishes demodulation and control signals AWS.

Figure 2:
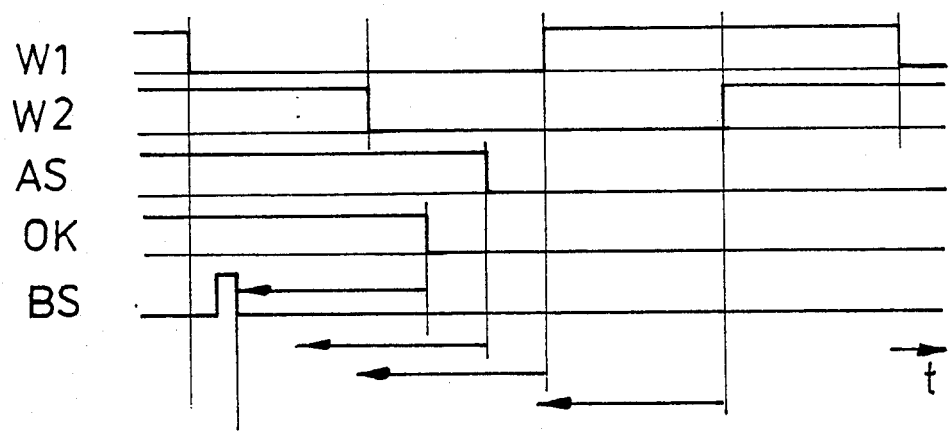

FIG. 2 shows, before an electrical adjustment but after completed run-up of the stepping motor 3, its commutator signals W 1 and W 2, for instance, an electrical analog signal AS , the optocoupler signal OK as sensor signal for synchronizing the original electrical analog signals AS present with any phase with respect to the reference signal BS.

The relationship of the commutator signals W 1 and W 2 to the analog signal AS, optocoupler signal OK and phase reference signal BS may be assumed to be arbitrary here.

In automatic synchronization the phase of the commutator signals W 1, W 2 is shifted in fine steps until the phase of the optocoupler signal OK, dependent thereupon, coincides sufficiently accurately with that of the phase signal BS, the synchronous signal being so short that it is not shown separately.

The phase of the electrical analog signal AS is shifted by the same amount. The arrows indicate the signal shift.

Figure 3:
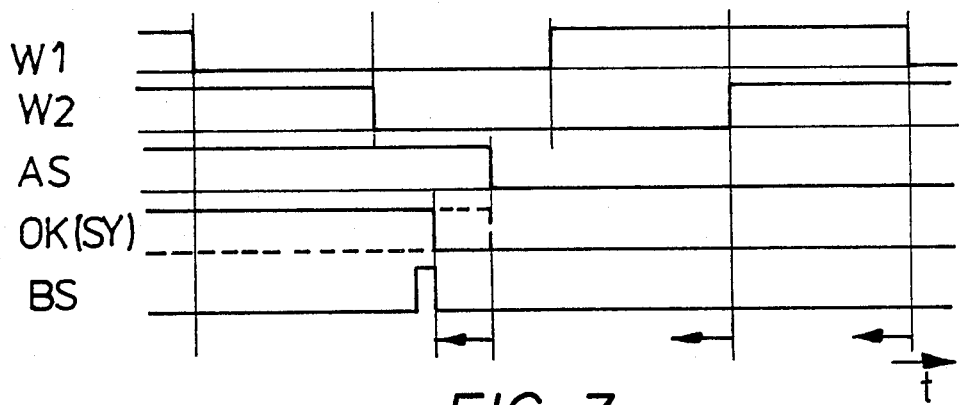

Automatic synchronization is followed by the time lapse of FIG. 3. If the optocoupler signal OK, for example, is lengthened in time here by electrical adjustment, in order to obtain the synchronization signal SY (broken line) therefrom, because of the continued effective automatic synchronization the commutator signals W 1, W 2 and, with the phase of the rotor, the electrical analog signal AS shifts to the phase reference signal BS.

In this way the phase relationship of the analog signal AS is adjusted, pursuant to the invention, to that of the phase reference signal BS and thereupon to that of the analysis signals.

The adjusted state is represented in FIG. 4.

After adjustment and completed automatic synchronization, the phase reference signal BS may be used as control signal KS for synchronous operation, within whose H state, for example, the H/L side of the synchronization signal SY must lie, it being advantageous to increase, for example to double, the time of the H pulse with respect to the phase reference signal BS.

On the other hand, the pulse width of the control signal KS determines the maximum permissible difference in the phases. To keep the motor frequency in the synchronization state constant, it is advantageous to use like service times in all program branches and not to use interrupts.

From the difference of actual and desired phase relationships determined at the beginning of a synchronization the computer calculates by how many partial steps the commutator signals are to be shifted.

A shifting of the commutator signals is obtained by variation of the computer cycles necessary for a full step. For this, a list with, for example, 32 places for the 32 parts of a full step may be cycled forward or backward. (See FIG. 5.) One single place is pointed to by pointer 22.

Should the phase of the corresponding commutator signals not be shifted, the marked place is kept in its position and, in continuing cycling of the list, produces a count pulse for the 2-bit counter in each instance.

However, the phase of this count pulse and with it that of the commutator signals may alternatively be varied simply by shift of the marked location in the list. Using another list, which is likewise cycled, the analyses signals may be formed.

To synchronize the phases of two step drives to one another, each associated with a list, list lengths and/or timing frequency for list cycling may be varied timewise.

We claim:

1. In a method for adjusting the phase of a step-driven apparatus, the apparatus being adapted to produce analog signals, in which a stepping motor is activated by commutating signals to drive a device whose phase is synchronized to signals of other devices, and wherein a synchronization signal is generated responsive to the phase of a sensor signal of the apparatus for synchronization of one or a plurality of said analog signals of the apparatus for comparison with analysis signals for analyzing the analog signals, the improvement comprising setting the phase of the synchronization signal once to be synchronous to the phase of the analog signals by adjusting the phase of the synchronization signals, constantly comparing the phase of the synchronization signal with a predetermined phase reference signal and thereupon with the analysis signals, and varying the phase of the commutating signals for the stepping motor as finely as possible as a function of the phase difference between the synchronization signal and the phase reference signal when the difference exceeds predetermined limits.

2. The method of claim 1, comprising comparing the phase of the synchronization signal directly with the phase of the phase reference signal, and wherein the step of constantly comparing comprises forming a control signal from the phase reference that is symmetrical to the synchronization flank of the phase refernce signal, and comparing the control signal with the synchronization signal.

3. Method according to claim 1, comprising varying the phase of the commutating signals for the stepping motor as a function of the phase comparison of synchronization and phase reference signals.

* * * * *